United States Patent Office 2,818,388
Patented Dec. 31, 1957

2,818,388

CORROSION INHIBITION

Vincent A. Sullivan, Jr., and Tor Halfdan Smedslund, Chicago, Ill., assignor to The Stepan Chemical Company, Chicago, Ill., a corporation of Illinois No Drawing. Application January 4, 1954
Serial No. 402,154

7 Claims. (Cl. 252—75)

The invention relates to corrosion inhibition, and more particularly, to corrosion inhibition with respect to certain aqueous and anhydrous dimethyl sulfoxide compositions which normally corrode metals.

Dimethyl sulfoxide, which has the following formula:

$$CH_3-\overset{O}{\underset{\|}{S}}-CH_3$$

had, heretofore, been considered little more than a laboratory curiosity; but recently a number of particularly valuable uses have been discovered for dimethyl sulfoxide in its anhydrous form as well as in the form of aqueous solutions thereof. Such uses include uses in brake fluids as well as in anti-freeze (aqueous) compositions. It has also been found that dimethyl sulfoxide has a noticeable tendency to corrode metals (only in the presence of air), particularly iron and steel, and this tendency toward corrosion would ordinarily greatly limit the uses for dimethyl sulfoxide.

The instant invention is based upon certain discoveries which have been made relating to corrosion inhibition of dimethyl sulfoxide compositions. Primarily these discoveries relate to the finding of certain ingredients which may act as corrosion inhibitors in a dimethyl sulfoxide composition; but also these discoveries relate to certain conditions to which dimethyl sulfoxide compositions may be subjected so as to reduce their tendency toward corrosion of metals.

It is, therefore, an important object of the instant invention to provide improved corrosion inhibition for dimethyl sulfoxide compositions.

It is another object of the instant invention to provide aqueous and anhydrous dimethyl sulfoxide compositions which have improved corrosion inhibitors therein.

A further object of the instant invention is to provide a process of decreasing the corrosion of iron by dimethyl sulfoxide by maintaining an oxygen free atmosphere over the dimethyl sulfoxide and by dissolving a compatible inert base therein.

Yet another object is to provide dimethyl sulfoxide having dissolved therein in a concentration of 0.01–0.05 mol per liter a compatible non-corrosive base.

Other objects, features and advantages of the invention will become apparent to those skilled in the art from the following detailed disclosure of specific examples of preferred embodiments of the invention.

The invention consists in a composition consisting essentially of aqueous or anhydrous dimethyl sulfoxide and, as a corrosion inhibitor, a compatible inert base dissolved therein in a concentration of about 0.005–0.1 mol per liter. In the aqueous dimethyl sulfoxide composition the base imparts a pH of about 8–12, and preferably about 9–11, to the composition. The base used in the anhydrous dimethyl sulfoxide also has this property (with respect to aqueous dimethyl sulfoxide) but the pH determination in anhydrous dimethyl sulfoxide is not as clear cut a determination.

Dimethyl sulfoxide is somewhat hygroscopic and, therefore, anhydrous dimethyl sulfoxide or C. P. dimethyl sulfoxide usually as small amounts of water up to 0.1% which may be picked up by the dimethyl sulfoxide whenever it is exposed to moist air. As used herein, "anhydrous" dimethyl sulfoxide is C. P. dimethyl sulfoxide which contains not more than 0.1 weight percent moisture and has a melting point of at least 18.4° C. Aqueous dimethyl sulfoxide thus is a dimethyl sulfoxide composition containing at least more than the maximum moisture content for C. P. dimethyl sulfoxide and, for practical purposes at least about 10 weight percent of water. For practical purposes also the minimum amount of dimethyl sulfoxide in water is about 10 weight percent (or a 10% aqueous dimethyl sulfoxide solution). Preferably, a 30–60% aqueous dimethyl sulfoxide solution is used, since such a solution has a sufficiently depressed freezing point to make it particularly valuable for a number of uses including that of an anti-freeze composition. A 45% aqueous dimethyl sulfoxide solution is particularly useful, having a freezing point of minus 25° F.

The bases which may be used in the practice of the instant invention are preferably soluble in dimethyl sulfoxide and/or water and most preferably both. At least, such bases are soluble in the medium used which is either anhydrous or aqueous dimethyl sulfoxide; and the base is capable of imparting a pH of at least about 8–12, and preferably about 9–11, to the aqueous dimethyl sulfoxide using the proportions of base hereinbefore set forth.

Preferably any organic base used is an amine (or amide) type compound. It may be a cyclic compound (e. g. morpholine) or it may be non-cyclic or chain-like in structure (e. g. diethanolamine). The amines may be primary (e. g. monoethanolamine), secondary (e. g. dibutyl amine) and tertiary (e. g. triethanolamine). Certain atomic arrangements have been found to be particularly satisfactory. For example, the structure $$-\overset{|}{N}-(CH_2)_n-X$$

wherein N is an amine nitrogen, n is an integer from 2 to 3 and X is N or O has been found to be characteristic of a large group of the more preferred bases, which include the mono-, di- and tri-ethanolamines (wherein n is 2 and X is O); the propanolamines (wherein n is 3); the morpholine series (wherein n is 2 and X is O); and the alkylene diamines such as $$Y-NH-R-NH_2$$

wherein R is a $C_2$—$C_3$ alkylene radical (ethylene or propylene) and Y is H or a $C_1$—$C_{18}$ alkyl chain. Ethylene diamine is the preferred polyamine; but an $$Octadecyl-NH-(CH_2)_3-NH_2$$

composition sold under the trade name "Duamine T" (tallow base) has also been found to give good results.

As previously mentioned, ethylene diamine is a preferred compound and it has been found that compounds containing a plurality of $$-\overset{|}{C}-NH_2$$

groups (preferably two) are particularly satisfactory. Such compounds include ethylene diamine and guanidine carbonate.

Among the compounds wherein X is O the most preferred compounds are those having the $$-\overset{|}{N}-CH_2CH_2-O-$$

structure either in the cyclic morpholine series which include morpholine and the N-alkyl ($C_1$—$C_3$) morpholines such as N-methyl morpholine, or in the non-cyclic ethanolamines having the formula:

$$(A)_xN[-CH_2CH_2-OH]_y$$

wherein $X+Y=3$ and $x$ and $y$ are each integers from 1 to 2, and A is H, $C_1$—$C_4$ alkyl or -ethanol. Examples include monoethanolamine, diethanolamine, methyl diethanolamine, diethyl ethanolamine and triethanolamine.

The complexes of these bases with weak inorganic acids such as the phosphates, borates, carbonates, etc. may also be used. Examples of the most useful include triethanolamine phosphate and guanidine carbonate.

The inorganic bases which may be used are preferably salts of a strong base (i. e. NaOH, KOH and $NH_4OH$) with a weak acid such as nitrous, phosphoric, chromic, boric, carbonic, etc. Typical examples of preferred inorganic bases are sodium nitrite, potassium nitrite, potassium chromate, trisodium phosphate, sodium borate, sodium carbonate, and ammonium hydroxide. Also, alkaline earth metal salts such as calcium and barium nitrites are sufficiently basic to be useful in the instant invention. The nitrite in particular may be a salt of an alkaline earth metal or an alkali metal.

Typical demonstrations of the corrosion inhibiting effect obtained in the instant invention are shown in the following examples.

*Example I*

A steel strip is immersed in C. P. dimethyl sulfoxide (as a control) maintained at 80° C. for six days and the strip is found to have a brass-like covering indicating a noticeable amount of corrosive action. If the process is repeated using a 45% aqueous dimethyl sulfoxide solution (as a control) a black coating indicating more extensive corrosive action is found on the strip.

A steel strip is immersed in a dimethyl sulfoxide (C. P.) bath which has guanidine carbonate dissolved therein in a concentration of 0.01 mol per liter so as to impart a pH of 8.8 thereto; the strip is retained in the bath maintained at 80° C. for thirteen days at which it is found that the strip is substantially unchanged, thereby indicating a minimum of corrosive action.

A steel strip is immersed in a 45% aqueous dimethyl sulfoxide solution which has guanidine carbonate dissolved therein in a concentration of 0.02 mol per liter so as to impart a pH of 12.3 thereto; the strip is retained in the solution maintained at 80° C. for 11 days at which time it is found that the strip is substantially unchanged, indicating no appreciable corrosive action.

*Example II*

A steel strip is immersed in a dimethyl sulfoxide (C. P.) bath which has morpholine dissolved therein in a concentration of 0.01 mol per liter; the strip is retained in the bath maintained at 80° C. for 13 days at which time the pH is 4.9 and it is found that the strip has a very light black-velvet film thereon, thereby indicating a very small amount of corrosive action. The amount of corrosive action thus indicated is very substantially less than that resulting from the use of the control bath (containing no inhibitor).

*Example III*

A steel strip is immersed in a 45% aqueous dimethyl sulfoxide solution which has dissolved therein morpholine in a concentration of 0.1 mol per liter so as to impart a pH of 10.5 thereto; the strip is retained in the solution maintained at 80° C. for seven days at which time it is found that the strip is substantially unchanged, thereby indicating a minimum of corrosive action.

Other morpholine derivatives such as methyl and dimethyl morpholine, and ethanol morpholine may be used to obtain comparably good results; such morpholines are preferably $C_1$—$C_2$ alkyl and/or $C_2$—$C_3$ alkylol morpholines. Other cyclic amines such as pyridine and the $C_1$—$C_2$ alkyl and/or $C_2$—$C_3$ alkylol derivatives may also be used; for example, 1,3,5-trimethyl pyridine gives a distinct corrosion inhibiting effect; although the morpholines give the more clear corrosion inhibiting effect and, of these, morpholine per se is superior. Compounds such as N-methyl morpholine (imparting a pH of only 8.2 to the 45% aqueous dimethyl sulfoxide at the end of the test) are not as effective as "bases" but they give good results.

*Example IV*

The morpholines as well as the other organic bases may also be used in combination with other bases including the inorganic bases. For example, a steel strip is immersed in 45% aqueous dimethyl sulfoxide solution which has morpholine and potassium nitrite dissolved therein, each in a concentration of 0.01 mol per liter so as to impart a pH of 10.5 thereto; and the strip is retained in the bath maintained at 80° C. for 11 days at which time it is found that the strip is substantially unchanged, indicating the minimum corrosive action.

Substantially the same results are obtained using potassium chromate in place of the potassium nitrite in the aforementioned procedure, although the corrosion inhibiting effect is not quite as good using the potassium chromate.

*Example V*

A steel strip is immersed in a 45% aqueous dimethyl sulfoxide bath which has dissolved therein trisodium phosphate in a concentration of 0.005 mol per liter so as to impart a pH of 12.3 thereto; and it is noted that the strip is substantially unchanged after being immersed in the bath at 80° C. for 13 days.

*Example VI*

Using a bath of 45% aqueous dimethyl sulfoxide solution having ammonium hydroxide dissolved therein in a concentration of 0.05 imparting a pH of 11.8 thereto and maintained at 80° C., it is found that the steel strip retained therein for a period of 11 days is substantially unchanged.

*Example VII*

A steel strip is immersed in 45% aqueous dimethyl sulfoxide solution which has dissolved therein potassium nitrite in a concentration of 0.01 mol per liter so as to impart a pH of 9.4 thereto; and the strip is maintained in a bath maintained at 80° C. for 11 days at which time it is found that the strip is substantially unchanged.

*Example VIII*

A procedure is carried out that is the same as that described in the foregoing example except that potassium chromate is substituted for potassium nitrite and the pH obtained is 10.6, and it is found that the results obtained are subsantially the same.

*Example IX*

A steel strip is immersed in a 45% aqueous dimethyl sulfoxide solution having dissolved therein triethanol amine phosphate in a concentration of 0.01 mol per liter so as to impart a pH of 9.2 thereto; and it is noted that the strip is substantially unchanged after being immersed 12 days in the bath at 80° C.

*Example X*

Substantially the same results as those described in the foregoing example are obtained using di-n-butyl amine in a concentration of 0.02 mol per liter. A noticeable corrosion inhibiting effect is also obtained using tributyl amine, but this compound is somewhat less satisfactory because it is not as readily soluble in the bath.

*Example XI*

A steel strip is immersed in a 45% aqueous dimethyl sulfoxide solution wherein there is dissolved methyl diethanol amine in a concentration of 0.02 mol per liter to give a pH of 9.2 to the solution; and no change is noticed in the immersed strip after standing eight days in the solution at 80° C.

Example XII

A steel strip is immersed in dimethyl sulfoxide (C. P.) which has ethylene diamine dissolved therein in a concentration of 0.01 mol per liter so as to impart a pH of 9.2 thereto; and the strip is retained in the dimethyl sulfoxide maintained at 80° C. for 12 days, at which time it is found that the strip is substantially unchanged.

Example XIII

A procedure is carried out that is the same as that described in the foregoing example except that monoisopropanol amine is used in place of the ethylene diamine (which gives a resulting pH of 6.0) and there is relatively no change in the steel strip, although the results obtained using ethylene diamine are somewhat better.

Example XIX

A steel strip is immersed in a 45% aqueous dimethyl sulfoxide solution which has diethyl ethanol amine dissolved therein in a concentration of 0.02 mol per liter so as to impart a pH of 10.1 thereto; and the strip is retained in the bath maintained at 80° C. for eight days at which time it is noted that the strip is substantially unchanged.

Other formulations which have been found to be particularly effective include the following:

Formulations (45% aqueous dimethyl sulfoxide):
- (A) Potassium nitrite _____ 0.1 mg./25 ml.
  - Kerosene _____ 0.5 mg./25 ml.
- (B) Guanidine carbonate _____ 0.1 mg./25 ml.
  - Na lauryl sulfate _____ 0.1 mg./25 ml.
  - Kerosene _____ 0.5 mg./25 ml.
  - $NH_4OH$ _____ 0.5 mg./25 ml.
- (C) Diethylamine _____ 0.19 mg./25 ml.
- (D) Guanidine carbonate _____ 0.1 mg./25 ml.
  - Ethylene diamine _____ 0.1 mg./25 ml.
  - Triethanolamine oleate _____ 0.1 mg./25 ml.
  - Kerosene _____ 0.5 mg./25 ml.
- (E) Duamine T _____ percent__ 0.3
- (F) Fatty acid amide ("alrosol") _____do____ 0.3

Formulation (C. P. dimethyl sulfoxide):
- (G) Guanidine carbonate _____ 0.056 mg./25 ml.
  - Morpholine _____ 0.05 mg./25 ml.

In addition, a particularly improved corrosion inhibiting effect is obtained, if the bath is maintained in an oxygen free atmosphere (such as acetylene). Acetylene is preferred for this purpose because it is soluble in dimethyl sulfoxide; but any oxygen free (i. e. gas free from molecular oxygen) gas may be used, such as nitrogen, ammonia, etc. The effectiveness of the step of excluding oxygen from the "zone" in which the strip is immersed in the dimethyl sulfoxide bath is particularly noticeable if a portion of the strip is positioned at the bath liquid level.

It will be noted that an improvement in the corrosion inhibiting effect is obtained if small amounts (i. e., 1.5 weight %) of kerosene are included in the corrosion inhibiting formulation. Also, an improvement is obtained if small amounts (i. e., 0.1-2 weight %) of wetting agents such as sodium lauryl sulfate are included.

It appears that the best corrosion inhibitors for all around performance are guanidine carbonate, ethylene diamine, and morpholine, and the best of these is guanidine carbonate. However, it has been found that superior results may often be obtained using combinations of two or more of these ingredients and/or potassium nitrite which appears to be the most effective inorganic base.

It will be understood that modifications and variations may be effected without departing from the scope of the novel concepts of the present invention.

We claim as our invention:

1. A composition consisting essentially of aqueous dimethyl sulfoxide and, as a corrosion inhibitor, an amine selected from the group consisting of guanidine carbonate, morpholines, $C_1$—$C_4$ alkyl amines, $C_2$—$C_3$ alkylol amines, and $C_2$—$C_3$ alkylene diamines dissolved therein in a concentration of 0.005–0.1 mol per liter and imparting a pH of 8–12 to the composition.

2. A composition consisting essentially of aqueous dimethyl sulfoxide and, as a corrosion inhibitor, guanidine carbonate dissolved therein in a concentration of 0.005–0.1 mol per liter and imparting of pH of 8–12 to the composition.

3. Dimethyl sulfoxide containing, as a corrosion inhibitor, guanidine carbonate dissolved therein in a concentration of 0.005–0.1 mol per liter.

4. Anhydrous dimethyl sulfoxide containing, as a corrosion inhibitor, morpholine dissolved therein in a concentration of 0.005–0.1 mol per liter.

5. Anydrous dimethyl sulfoxide containing, as a corrosion inhibitor, ethylene diamine dissolved therein in a concentration of 0.005–0.1 mol per liter.

6. Dimethyl sulfoxide having dissolved therein guanidine carbonate and morpholine, each in a concentration of 0.01–0.05 mol per liter.

7. Dimethyl sulfoxide having dissolved therein guanidine carbonate and ethylene diamine, each in a concentration of 0.01–0.05 mol per liter.

References Cited in the file of this patent

UNITED STATES PATENTS

| Number | Name | Date |
|---|---|---|
| 1,981,109 | Klamroth et al. | Nov. 20, 1934 |
| 2,043,257 | Missbach | June 9, 1936 |
| 2,499,822 | Gilbert et al. | Mar. 7, 1950 |
| 2,581,050 | Smedslund | Jan. 1, 1952 |
| 2,602,779 | Moyer et al. | July 8, 1952 |
| 2,658,038 | Proell | Nov. 3, 1953 |

OTHER REFERENCES

Fieser et al.: "Organic Chemistry," 2nd edition, page 32 (1950).